United States Patent
Seki et al.

(10) Patent No.: US 9,456,477 B2
(45) Date of Patent: Sep. 27, 2016

(54) LIGHTING DEVICE AND LIGHTING FIXTURE USING SAME

(71) Applicant: Panasonic Intellectual Property Management Co., Ltd., Osaka (JP)

(72) Inventors: Keisuke Seki, Osaka (JP); Takeshi Kamoi, Kyoto (JP); Daisuke Yamahara, Osaka (JP); Hiroyuki Asano, Nara (JP); Masafumi Yamamoto, Kyoto (JP); Masato Himeda, Nara (JP); Katsuyuki Doi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/944,272

(22) Filed: Nov. 18, 2015

(65) Prior Publication Data
US 2016/0150609 A1    May 26, 2016

(30) Foreign Application Priority Data

Nov. 20, 2014  (JP) .................................. 2014-235772

(51) Int. Cl.
*H01L 33/00* (2010.01)
*H05B 33/08* (2006.01)

(52) U.S. Cl.
CPC ...... *H05B 33/0815* (2013.01); *H05B 33/0842* (2013.01)

(58) Field of Classification Search
CPC ....... H01L 33/00; H02M 3/155; H02M 7/12; H05B 33/0818; H05B 33/0851; H05B 33/0884
USPC .............. 315/276, 287, 307, 209, 291, 208; 323/282, 285, 288, 222; 363/89, 65, 363/131
See application file for complete search history.

(56) References Cited

U.S. PATENT DOCUMENTS

| | | | |
|---|---|---|---|
| 2004/0170037 A1 | 9/2004 | Bucks et al. | |
| 2010/0039039 A1* | 2/2010 | Goriki | H05B 41/288 315/246 |
| 2011/0037406 A1* | 2/2011 | Matsuzaki | H05B 41/042 315/276 |
| 2014/0117868 A1 | 5/2014 | Lopez et al. | |
| 2015/0008826 A1 | 1/2015 | Wu et al. | |
| 2015/0312983 A1* | 10/2015 | Hu | F21K 9/1355 315/186 |

FOREIGN PATENT DOCUMENTS

| | | |
|---|---|---|
| JP | 2004-536434 A | 12/2004 |
| JP | 2007-189004 A | 7/2007 |
| JP | 2011-082204 A | 4/2011 |
| JP | 3187637 U | 11/2013 |
| JP | 2014-520366 A | 8/2014 |
| WO | WO 03/009654 A1 | 1/2003 |
| WO | WO 2012/172472 A1 | 12/2012 |

* cited by examiner

*Primary Examiner* — Thai Pham
*Assistant Examiner* — Wei Chan
(74) *Attorney, Agent, or Firm* — Renner, Otto, Boisselle & Sklar, LLP

(57) ABSTRACT

A lighting device includes a rectifier circuit, a conversion circuit and a control circuit. A first inductor of a first series circuit and a second inductor of a second series circuit have inductances by which a time period, during which a diode is electrically conducted, is made shorter than a half period of a resonance period of a closed loop circuit. The closed loop circuit includes a first capacitor, the first inductor, a second capacitor and a third capacitor. The control circuit is configured to control a switching element in such a manner that the switching element is turned on at fixed periods.

20 Claims, 6 Drawing Sheets

LIGHTING DEVICE AND LIGHTING FIXTURE USING SAME

CROSS-REFERENCE TO RELATED APPLICATION

This application claims the benefit of priority of Japanese Patent Application Number 2014-235772, filed on Nov. 20, 2014, the entire contents of which are hereby incorporated by reference.

TECHNICAL FIELD

The present disclosure relates generally to lighting devices and lighting fixtures, and more particularly, to a lighting device that turns on a light source, and to a lighting fixture that uses the lighting device.

BACKGROUND ART

Switching devices have been conventionally proposed that operate light emitting diodes (LEDs) (JP 2004-536434 A, hereafter referred to as "Document 1").

The switching device disclosed in Document 1 is provided with a single-ended primary inductance converter (SEPIC).

Document 1 discloses three capacitors (a bypass capacitor, a capacitor and buffer capacitor), and a switching element, as electronic components that make up the SEPIC. Document 1 further discloses three inductors (a self-inductor, as well as a primary winding and a secondary winding of a transformer), and a diode, as electronic components that make up the SEPIC.

Improvements in power factor are desirable in lighting devices such as the switching device disclosed in Document 1.

To improve the power factor, the capacitances of the bypass capacitor and the capacitor in the switching device disclosed in Document 1 must be set to be comparatively small.

In this switching device, however, a concern arises in that, when the capacitances of the bypass capacitor and the capacitor are set to be comparatively small, the resonance current may flow in a closed loop circuit that includes the bypass capacitor, the self-inductor, the capacitor and the buffer capacitor. Accordingly, there is a possibility that the operation of the SEPIC becomes unstable when attempting to improve the power factor in the switching device disclosed in Document 1.

When the capacitances of the bypass capacitor and the capacitor are sufficiently large, i.e. when the resonance frequency of the closed loop circuit is sufficiently small with respect to the switching frequency of the switching element, a triangular-wave current flows in the diode, and the operation of the SEPIC is stable. When, by contrast, the capacitances of the bypass capacitor and of the capacitor are small, i.e. when the resonance frequency of the closed loop circuit is close to the switching frequency of the switching element, the current flowing in the diode has a resonance current superimposed onto the triangular-wave current flowing in the diode, and the operation of the SEPIC becomes unstable as a result.

SUMMARY

It is an object of the present disclosure to provide a lighting device the stability of operation whereof can be enhanced while improving a power factor, and to provide a lighting fixture in which the lighting device is used.

A lighting device according to one aspect of the present disclosure is for providing power from an AC power source to turn on a light source. The lighting device includes a pair of input terminals, a pair of output terminals, a rectifier circuit, a conversion circuit and a control circuit. The AC power source configured to output AC current may be electrically connected to the pair of input terminals. The light source may be electrically connected to the pair of output terminals. The rectifier circuit is configured to generate a pulsating current through full-wave rectification of the AC current. The conversion circuit is configured to convert the pulsating current from the rectifier circuit to a DC current, and to output the DC current to the pair of output terminals. The control circuit is configured to control the conversion circuit. The rectifier circuit includes a pair of first input ends and a pair of first output ends. The pair of first input ends is electrically connected to the pair of input terminals, respectively. The pair of first output ends is electrically connected to the conversion circuit. The conversion circuit is a single-ended primary inductance converter. The conversion circuit includes a pair of second input ends, a pair of second output ends, a first capacitor, a first series circuit, a second series circuit and a third series circuit. The pair of second input ends is electrically connected to the pair of first output ends of the rectifier circuit, respectively. The pair of second output ends is electrically connected to the pair of output terminals, respectively. The first capacitor is connected between the pair of second input ends. The first series circuit includes a first inductor and a switching element connected in series, and is connected in parallel to the first capacitor. The second series circuit includes a second capacitor and a second inductor connected in series, and is connected in parallel to the switching element. The third series circuit includes a diode and a third capacitor connected in series, and is connected in parallel to the second inductor. The third capacitor is connected between the pair of second output ends. The first inductor has an inductance by which a time period, during which the diode is electrically conducted, is made shorter than a half period of a resonance period of a closed loop circuit. The second inductor has an inductance such that a time period, during which the diode is electrically conducted, is made shorter the half period of the resonance period of the closed loop circuit. The closed loop circuit includes the first capacitor, the first inductor, the second capacitor, and the third capacitor. The control circuit is configured to control the switching element in such a manner that the switching element is turned on at fixed periods.

A lighting fixture according to one aspect of the present disclosure for providing power from an AC power source. The lighting fixture includes a lighting device, and a light source that can be turned on by the lighting device. The lighting device includes a pair of input terminals, a pair of output terminals, a rectifier circuit, a conversion circuit and a control circuit. The AC power source configured to output AC current may be electrically connected to the pair of input terminals. The light source may be electrically connected to the pair of output terminals. The rectifier circuit is configured to generate a pulsating current through full-wave rectification of the AC current. The conversion circuit is configured to convert the pulsating current from the rectifier circuit to a DC current, and to output the DC current to the pair of output terminals. The control circuit is configured to control the conversion circuit. The rectifier circuit includes a pair of first input ends and a pair of first output ends. The pair of first input ends is electrically connected to the pair of input terminals, respectively. The pair of first output ends is electrically connected to the conversion circuit. The conversion circuit is a single-ended primary inductance converter. The conversion circuit includes a pair of second input ends, a pair of second output ends, a first capacitor, a first series circuit, a second series circuit and a third series circuit. The pair of second input ends is electrically connected to the pair of first output ends of the rectifier circuit, respectively. The pair of second output ends is electrically connected to the pair of output terminals, respectively. The first capacitor is connected between the pair of second input ends. The first series circuit includes a first inductor and a switching element connected in series, and is connected in parallel to the first capacitor. The second series circuit includes a second capacitor and a second inductor connected in series, and is connected in parallel to the switching element. The third series circuit includes a diode and a third capacitor connected in series, and is connected in parallel to the second inductor. The third capacitor is connected between the pair of second output ends. The first inductor has an inductance by which a time period, during which the diode is electrically conducted, is made shorter than a half period of a resonance period of a closed loop circuit. The second inductor has an inductance such that a time period, during which the diode is electrically conducted, is made shorter the half period of the resonance period of the closed loop circuit. The closed loop circuit includes the first capacitor, the first inductor, the second capacitor, and the third capacitor. The control circuit is configured to control the switching element in such a manner that the switching element is turned on at fixed periods.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS

Embodiment 1

Figure 1:
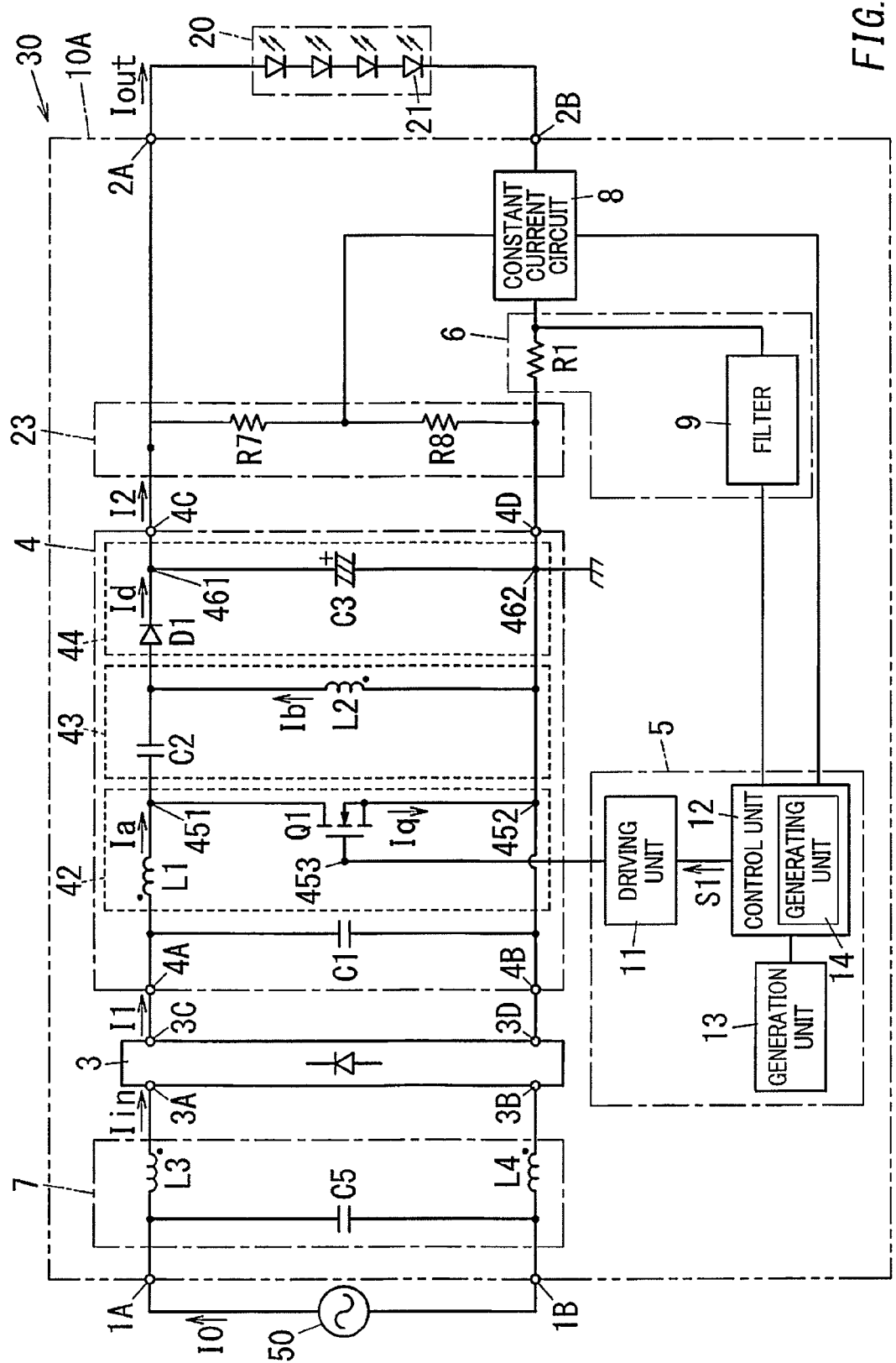
FIG. 1 is a circuit diagram of a lighting fixture provided with a lighting device of Embodiment 1.

A lighting device 10A of Embodiment 1 will be explained next with reference to FIG. 1 to FIG. 5.

The lighting device 10A is configured to turn on a light source 20. The light source 20 is provided with, for instance, a plurality (four in FIG. 1) of solid-state light-emitting elements 21. Each of the plurality of solid-state light-emitting elements 21 is, for instance, a light emitting diode (LED). The electrical connection of the plurality of solid-state light-emitting elements 21 is, for instance, a series connection. The emission color of the plurality of solid-state light-emitting elements 21 is, for instance, white.

Although the emission color of the plurality of solid-state light-emitting elements 21 of the light source 20 is set to white, the emission color is not limited thereto. In the example illustrated in FIG. 1, the electrical connection of the plurality of solid-state light-emitting elements 21 is a series connection, but is not limited thereto. The electrical connection of the plurality of solid-state light-emitting elements 21 may be, for instance, a parallel connection, or a connection scheme that combines series connection and parallel connection. The solid-state light-emitting elements 21 in the light source 20 are LEDs, but are not limited thereto. For instance, the solid-state light-emitting elements 21 may be semiconductor laser elements, organic electroluminescent elements or the like. In the example illustrated in FIG. 1, the light source 20 is provided with the plurality of solid-state light-emitting elements 21, but may be provided with just one solid-state light-emitting element 21.

The lighting device 10A is provided with a pair of input terminals 1A, 1B, a pair of output terminals 2A, 2B, a rectifier circuit 3, a conversion circuit 4, a control circuit 5 and a detection circuit 6. The lighting device 10A is also provided with a filter circuit 7 and a constant current circuit 8.

An AC power source 50 that outputs a sinusoidal AC current (AC voltage) I0 is electrically connected between the pair of input terminals 1A, 1B. The AC power source 50 is, for instance, a commercial power source. The lighting device 10A does not include the AC power source 50 as a constituent element.

The light source 20 is electrically connected between the pair of output terminals 2A, 2B. The lighting device 10A does not include the light source 20 as a constituent element.

The rectifier circuit 3 is configured, for instance, to perform full-wave rectification of AC current I0 from the AC power source 50. The rectifier circuit 3 is, for instance, a diode bridge. In other words, the rectifier circuit 3 is configured to generate a pulsating current I1 through full-wave rectification of the AC current I0. The rectifier circuit 3 is configured to output the pulsating current I1 to the conversion circuit 4.

The rectifier circuit 3 is provided with a pair of input ends (pair of first input ends) 3A, 3B, and a pair of output ends (pair of first output ends) 3C, 3D. The pair of input ends 3A, 3B of the rectifier circuit 3 is electrically connected to the pair of input terminals 1A, 1B respectively, by way of the filter circuit 7. The pair of output ends 3C, 3D of the rectifier circuit 3 is electrically connected to the conversion circuit 4. In further detail, the pair of output ends 3C, 3D of the rectifier circuit 3 is electrically connected to a pair of input ends 4A, 4B of the conversion circuit 4, respectively. The pair of input ends 3A, 3B may be connection terminals to which conducting wires that connect to the pair of input terminals 1A, 1B are connected, respectively, by way of the inductors L3, L4 of the filter circuit 7. Alternatively, the pair of input ends 3A, 3B may be part of the conducting wires that connect to the pair of input terminals 1A, 1B, respectively, by way of the inductors L3, L4 of the filter circuit 7. The pair of output ends 3C, 3D may be connection terminals to which conducting wires that connect to the pair of input ends 4A, 4B are connected, respectively, or may be part of the conducting wires that connect to the pair of input ends 4A, 4B, respectively.

The conversion circuit 4 is configured to convert the pulsating current I1 from the rectifier circuit 3 to DC current I2. The conversion circuit 4 is configured to output the DC current I2 to the pair of output terminals 2A, 2B. The conversion circuit 4 is a single-ended primary inductance converter (SEPIC).

The conversion circuit 4 is provided with, for instance, a capacitor (first capacitor C1) and a series circuit (first series circuit) 42 of an inductor (first inductor) L1 and a switching element Q1. The conversion circuit 4 is provided with a series circuit (second series circuit) 43 of a capacitor (second capacitor) C2 and an inductor (second inductor) L2, and with a series circuit (third series circuit) 44 of a diode D1 and a capacitor (third capacitor) C3.

The conversion circuit 4 is further provided with the pair of input ends (pair of second input ends) 4A, 4B, and the pair of output ends (pair of second output ends) 4C, 4D. The pair of input ends 4A, 4B is electrically connected to the pair of output ends 3C, 3D of the rectifier circuit 3, respectively. The pair of output ends 4C, 4D is electrically connected to the pair of output terminals 2A, 2B, respectively. The pair of input ends 4A, 4B may be connection terminals to which conducting wires are connected, or may be part of conducting wires. The pair of output ends 4C, 4D may be connection terminals to which conducting wires are connected, or may be part of conducting wires.

The switching element Q1 is provided with a first main terminal 451, a second main terminal 452 and a control terminal 453. The switching element Q1 is, for instance, an enhancement-type n-channel MOSFET. In the switching element Q1, the first main terminal 451 is a drain terminal, the second main terminal 452 is a source terminal, and the control terminal 453 is a gate terminal.

The first capacitor C1 is connected between the pair of input ends 4A, 4B of the conversion circuit 4.

The first series circuit 42 of the first inductor L1 and the switching element Q1 is electrically connected between both ends of the first capacitor C1. In other words, the first series circuit 42 is provided with the first inductor L1 and the switching element Q1. The first inductor L1 and the switching element Q1 are connected in series. The first series circuit 42 is connected in parallel to the first capacitor C1.

The second series circuit 43 of the second capacitor C2 and the second inductor L2 is electrically connected between the drain terminal (first main terminal 451) and the source terminal (second main terminal 452) of the switching element Q1. The gate terminal (control terminal 453) of the switching element Q1 is electrically connected to the control circuit 5. In other words, the second series circuit 43 is provided with the second capacitor C2 and the second inductor L2. The second capacitor C2 and the second inductor L2 are connected in series. The second series circuit 43 is connected in parallel to the switching element Q1.

The third series circuit 44 of the diode D1 and the third capacitor C3 is electrically connected between both ends of the second inductor L2. The anode of the diode D1 is electrically connected to the second inductor L2. The cathode of the diode D1 is electrically connected to the third capacitor C3. In other words, the third series circuit 44 is provided with the diode D1 and the third capacitor C3. The diode D1 and the third capacitor C3 are connected in series. The third series circuit 44 is connected in parallel to the second inductor L2.

The third capacitor C3 is connected between the pair of output ends 4C, 4D of the conversion circuit 4. The third capacitor C3 is provided with a high potential-side terminal 461 and a low potential-side terminal 462.

The high potential-side terminal 461 of the third capacitor C3 is electrically connected to the output terminal 2A. The low potential-side terminal 462 of the third capacitor C3 is electrically connected to the output terminal 2B, via the detection circuit 6 and the constant current circuit 8. In other words, the pair of output ends 4C, 4D of the conversion circuit 4 is electrically connected to the pair of output terminals 2A, 2B, respectively. The control circuit 5 is configured to control the conversion circuit 4. Explained in specific terms, the control circuit 5 is configured to control the switching element Q1. The control circuit 5 will be explained in detail further on.

The conversion circuit 4 is configured to output the DC current I2, through on-off control of the switching element Q1 by the control circuit 5.

The operation of the conversion circuit 4 will be explained next.

When in the conversion circuit 4 the switching element Q1 is brought from an off-state to an on-state, current flows in a path over the high potential-side terminal of the first capacitor C1, the first inductor L1, the switching element Q1 and the low potential-side terminal of the first capacitor C1. When in the conversion circuit 4 the switching element Q1 is brought from an off-state to an on-state, current also flows in a path over the high potential-side terminal of the second capacitor C2, the switching element Q1, the second inductor L2, and the low potential-side terminal of the second capacitor C2. When in the conversion circuit 4 the switching element Q1 is in an on-state, accordingly, magnetic energy accumulates in the first inductor L1 and the second inductor L2.

When in the conversion circuit 4 the switching element Q1 is brought from an on-state to an off-state, moreover, a back electromotive force is generated in the first inductor L1. As a result, current flows, in the conversion circuit 4, in a path over the first end of the first inductor L1, the second capacitor C2, the diode D1, the third capacitor C3, the first capacitor C1, and a second end of the first inductor L1. When in the conversion circuit 4 the switching element Q1 is brought from an on-state to an off-state, a back electromotive force is generated in the second inductor L2, and hence current flows in a path over the first end of the second inductor L2, the diode D1, the third capacitor C3, and a second end of the second inductor L2, As a result, the DC current I2 can be outputted when in the conversion circuit 4 the voltage across the third capacitor C3 is equal to or greater than a threshold voltage.

The detection circuit 6 is configured to detect a voltage (hereafter, "detected voltage") Vr1 corresponding to a current Tout that flows in the light source 20. The detection circuit 6 is provided with a resistor R1 and a filter 9.

A first end of the resistor R1 is also electrically connected to the low potential-side terminal 462 of the third capacitor C3. A second end of the resistor R1 is electrically connected to the constant current circuit 8. The second end of the resistor R1 is electrically connected to the filter 9.

Figure 2:
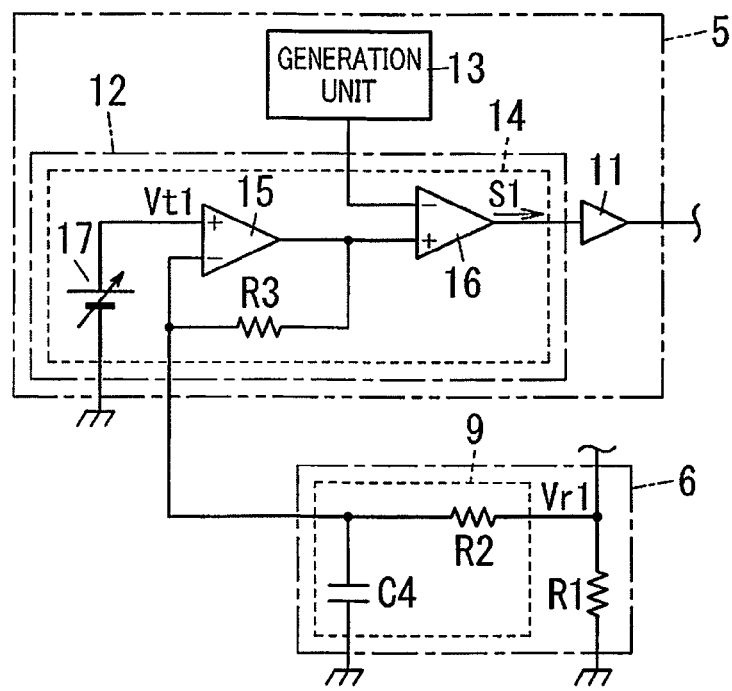
FIG. 2 is a circuit diagram of a control circuit and a detection circuit in the lighting device of Embodiment 1.
Figure 3:
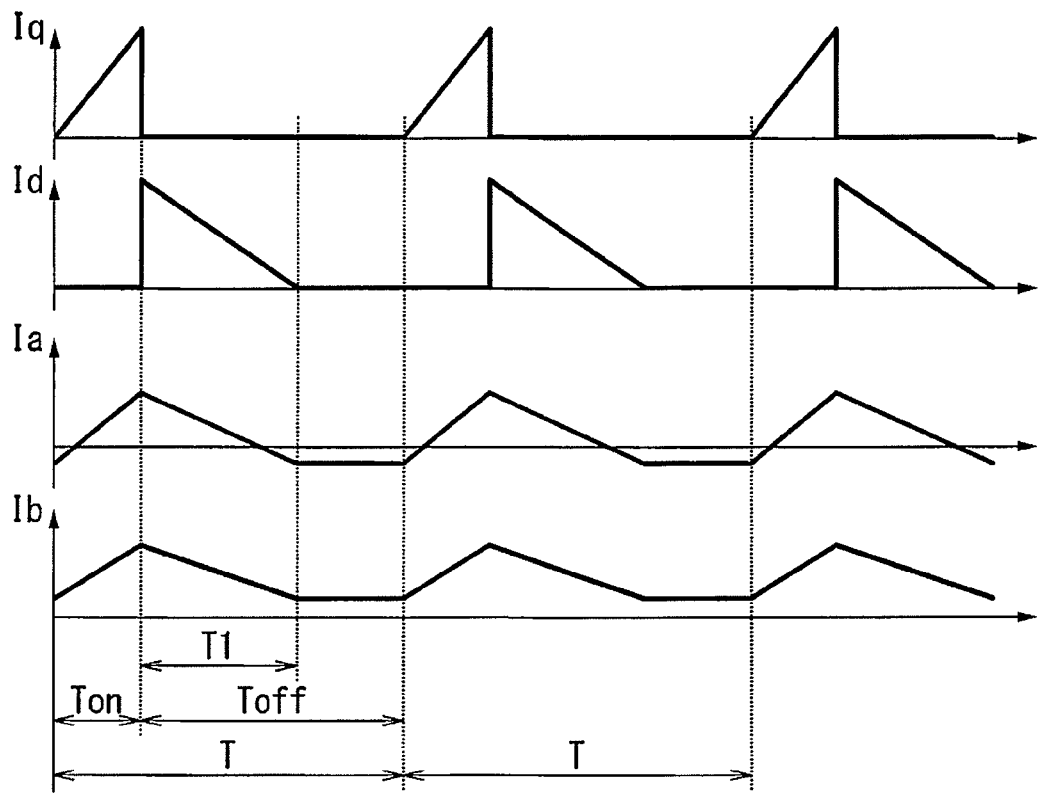
FIG. 3 is a timing chart illustrating the operation of a conversion circuit in the lighting device of Embodiment 1.
Figure 4:
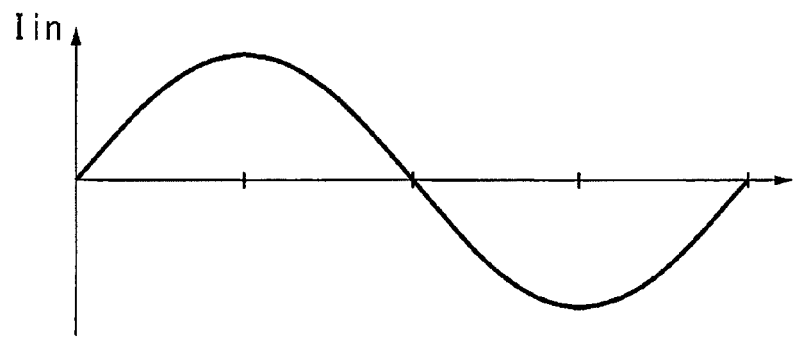
FIG. 4 is a waveform diagram illustrating input current in a rectifier circuit of the lighting device of Embodiment 1.

The filter 9 is an RC filter. The filter 9 is configured to remove noise in the voltage across the resistor R1. As illustrated in FIG. 2, the filter 9 is provided with a resistor R2 and a capacitor C4.

A first end of the resistor R2 is electrically connected to the second end of the resistor R1. A second end of the resistor R2 is electrically connected to the control circuit 5.

The second end of the resistor R2 is electrically connected to the low potential-side terminal 462 of the third capacitor C3, via the capacitor C4. That is, the second end of the resistor R2 is connected to a ground point, which corresponds to the low potential-side terminal 462 of the third capacitor C3 in FIG. 1, via the capacitor C4.

The filter circuit 7 is configured to remove noise. For instance, the filter circuit 7 is configured to remove noise (switching noise) that flows out from the switching element Q1 to the AC power source 50. For instance, the filter circuit 7 is configured to remove, among others, noise in the AC current I0 from the AC power source 50, as well as noise that is radiated into space. The filter circuit 7 is provided with a capacitor C5 and two inductors L3, L4. The capacitance of the capacitor C5 is, for instance, 0.1 µF.

The capacitor C5 is electrically connected between the pair of input terminals 1A, 1B. A first end of the inductor L3 is electrically connected to the input terminal 1A. A second end of the inductor L3 is electrically connected to the input end 3A, from among the pair of input ends 3A, 3B of the rectifier circuit 3. A first end of the inductor L4 is electrically connected to the input terminal 1B. A second end of the inductor L4 is electrically connected to the other input end 3B from among the pair of input ends 3A, 3B of the rectifier circuit 3.

The filter circuit 7 is provided with the capacitor C5 and the two inductors L3, L4, but the filter circuit 7 is not limited to this configuration. Further, the lighting device 10A is provided with the filter circuit 7, but need not be provided with the filter circuit 7.

The constant current circuit 8 is configured to make the DC current I2 outputted by the conversion circuit 4 into a constant current. As a result, flicker in the light can be can be suppressed so that an ordinary person looking at the light radiated by the light source 20 does not perceive flicker in the light. Herein, the constant current of the light source 20 denotes, for instance, a current having been rendered sufficiently constant that an ordinary person looking at the light radiated by the light source 20 does not perceive flicker in the light. The constant current circuit 8 will be described in detail further on.

In the lighting device 10A, an SEPIC is used as the conversion circuit 4. Accordingly, the capacitance of the first capacitor C1 and the capacitance of the second capacitor C2 are set to be smaller than that of the third capacitor C3, in order to improve the power factor of the lighting device 10A. The capacitance of the first capacitor C1 is, for instance, 0.1 µF. The capacitance of the second capacitor C2 is, for instance, 0.1 µF.

The capacitance of the third capacitor C3 in the lighting device 10A is set to be comparatively large. Explained by way of example, the capacitance of the third capacitor C3 is set to be larger than the capacitance of the first capacitor C1 and the capacitance of the second capacitor C2. The capacitance of the third capacitor C3 is, for instance, 1000 F.

The inventors of the present application devised a lighting device of Comparative example 1 that has the same configuration as that of the lighting device 10A. The lighting device of Comparative example 1 differs from the lighting device 10A as regards the inductance of the first inductor L1. The lighting device of Comparative example 1 also differs from the lighting device 10A as regards the inductance of the second inductor L2. Other features in Comparative example 1 are identical to those of the lighting device 10A.

The inventors of the present application found that a concern arises in that current flowing in the first inductor may oscillate, over the time period, during which the diode is electrically conducted, when, in the lighting device of Comparative example 1, the capacitance of the first capacitor and the capacitance of the second capacitor are set to be relatively small. Accordingly, the inventors of the present application addressed the possibility that the operation of the conversion circuit becomes unstable when, in the lighting device of Comparative example 1, the capacitance of the first capacitor and the capacitance of the second capacitor are set to be relatively small. Herein, the time period, during which the diode is electrically conducted, denotes a time period, during which current is flowing in the diode. For convenience in the explanation, the time period, during which the diode is electrically conducted, may be referred to also as "conduction period of the diode".

The inventors of the present application thought of setting the inductances of the first inductor L1 and the second inductor L2 to satisfy Expression (1) below, in order to suppress oscillation of the current Ia that flows in the first inductor L1 over the time period T1 (FIG. 3), during which the diode D1 in the lighting device 10A is electrically conducted. The time period T1, during which the diode D1 is electrically conducted, will be referred to hereafter as the conduction period T1 of the diode D1. The reference symbol Td1 in Expression (1) denotes the time period, during which the diode D1 is electrically conducted. The reference symbol L in Expression (1) denotes the inductance of the first inductor L1. The reference symbol Cx in Expression (1) denotes the combined capacitance of the first capacitor C1, the second capacitor C2 and the third capacitor C3. The reference symbol Iq in FIG. 3 denotes the current flowing in the switching element Q1. The reference symbol Id in FIG. 3 denotes the current flowing in the diode D1. The reference symbol Ia in FIG. 3 denotes the current flowing in the first inductor L1. The reference symbol Ib in FIG. 3 denotes the current flowing in the second inductor L2. The reference symbol T in FIG. 3 denotes the on-off period of the switching element Q1. The reference symbol Ton in FIG. 3 denotes the conduction period of the switching element Q1 in one period (one fixed period T). The reference symbol Toff in FIG. 3 denotes a cutoff time period of the switching element Q1 in one period (one fixed period T).

$$Td1 < \tfrac{1}{2} \cdot 2\pi\sqrt{L \cdot Cx} \qquad \text{Expression (1)}$$

In the lighting device 10A, the inductance of the first inductor L1 and the inductance of the second inductor L2 are set in such a manner that the conduction period T1 of the diode D1 is shorter than the half period of the resonance period of the below-described closed loop circuit. Specifically, the first inductor L1 and the second inductor L2 have inductances such that the time period T1, during which the diode D1 is electrically conducted, is made shorter than the half period of the resonance period of the closed loop circuit. The closed loop circuit includes the first capacitor C1, the first inductor L1, the second capacitor C2 and the third capacitor C3. As a result, oscillation of the current Ia flowing in the first inductor L1 can be suppressed, during the conduction period T1 of the diode D1, in the lighting device 10A. Accordingly, it becomes possible suppress superposition of the resonance current of the closed loop circuit onto the current Id that flows through the diode D1 in the lighting device 10A, and to increase the stability of the operation of the conversion circuit 4. Specifically, the stability of the operation of the conversion circuit 4 can be enhanced while improving the power factor, in the lighting device 10A. In essence, the stability of the operation of the lighting device 10A can be enhanced while improving the power factor.

Preferably, the inductance of the first inductor L1 is set to be larger than the inductance of the second inductor L2. The inductance of the first inductor L1 is set, for instance, to 500 µH. The inductance of the second inductor L2 is set, for instance, to 300 µH. As a result, it becomes possible to suppress oscillation of the current Ia that flows in the first inductor L1 during the conduction period T1 of the diode D1, and to turn on the switching element Q1 after the current Id flowing in the diode D1 reaches zero, in the lighting device 10A. In other words, in the lighting device 10A it becomes possible to suppress oscillation of the current Ia during the conduction period T1 of the diode D1, and to operate the conversion circuit 4 according to a discontinuous current mode (DCM). The stability of the operation of the lighting device 10A can be enhanced as a result while improving the power factor.

The control circuit 5 is configured to control the switching element Q1 in such a manner that the switching element Q1 is turned on at each fixed period T. The control circuit 5 is provided with a driving unit (driving circuit) 11, a control unit (controller) 12 and a generation unit (generation circuit) 13.

The driving unit 11 is configured to drive the switching element Q1. The driving unit 11 is electrically connected to the gate terminal (control terminal 453) of the switching element Q1.

The control unit 12 is, for instance, a micro-computer. The control unit 12 is configured to control the driving unit 11. Explained in specific terms, the control unit 12 is configured to output, to the driving unit 11, a control signal S1 for controlling the driving unit 11. The control signal S1 is, for instance, a pulse width modulation (PWM) signal. The driving unit 11 is configured to drive the switching element Q1 according to the control signal S1 from the control unit 12. In the control circuit 5, a micro-computer is used as the control unit 12, but the control circuit 5 is not limited thereto, and, for instance, a control IC or the like may be used. The control circuit 5 is configured by being provided with the driving unit 11, the control unit 12 and the generation unit 13, but is not particularly limited to that configuration.

The generation unit 13 is a waveform generator configured to generate a triangular wave signal of a fixed period T (for instance, 22.2 µs).

The control unit 12 is provided with a generating unit (generating circuit) 14 that is configured to generate the control signal S1.

The generating unit 14 is configured to generate a difference voltage across a detected voltage Vr1 that is detected by the detection circuit 6, and a reference voltage (hereafter, "first reference voltage") Vt1 established beforehand. The generating unit 14 is configured to generate, as the control signal S1, a first control signal for controlling the driving unit 11 in such a way so as to turn on the switching element Q1, at fixed periods T, on the basis of the signal level of the triangular wave signal from the generation unit 13 and the voltage level of the above difference voltage. The generating unit 14 is configured to generate the first control signal on the basis of the signal level of the triangular wave signal from the generation unit 13 and on the basis of the voltage level of the difference voltage (on the basis of a so-called triangular wave comparison method), but the generating unit 14 is not limited to this configuration. For instance, the generating unit 14 may be configured to generate the first control signal on the basis of a digital control scheme.

As illustrated in FIG. 2, the generating unit 14 is provided with a resistor R3, an operational amplifier 15, a comparator 16 and a setting unit 17. The setting unit 17 is configured to output the first reference voltage Vt1. The setting unit 17 is configured to be capable of varying the voltage level of the first reference voltage Vt1. For instance, the setting unit 17 is a DC power source capable of modifying the voltage level of the first reference voltage Vt1. The resistor R3 and the operational amplifier 15 make up an error amplifier in the generating unit 14.

A first end of the resistor R3 is electrically connected to the second end of the resistor R2 in the detection circuit 6. The first end of the resistor R3 is electrically connected to an inverting input terminal of the operational amplifier 15. A second end of the resistor R3 is electrically connected to an output terminal of the operational amplifier 15.

A non-inverting input terminal of the operational amplifier 15 is electrically connected to the setting unit 17. The output terminal of the operational amplifier 15 is electrically connected to a non-inverting input terminal of the comparator 16.

An inverting input terminal of the comparator 16 is electrically connected to the generation unit 13. An output terminal of the comparator 16 is electrically connected to the driving unit 11, the driving unit 11 being an amplifier, for example.

In the lighting device 10A, the control circuit 5 turns on the switching element Q1 at each fixed period T, and hence it becomes possible to reduce a harmonic component (for instance, fifth harmonic component) in an input current Iin of the rectifier circuit 3. In the lighting device 10A, therefore, it becomes possible to make the waveform of the input current Iin of the rectifier circuit 3 into a sinusoidal waveform, identical to the waveform of the AC current I0 from the AC power source 50 (FIG. 4), and a yet higher power factor can be achieved.

Preferably, the control circuit 5 controls the switching element Q1 in such a manner that the conduction period Ton of the switching element Q1 is constant. That is, the control circuit 5 is preferably configured to control the switching element Q1 in such a manner that a plurality of conduction periods Ton, during which the switching element Q1 is electrically conducted, is constant. In other words, the control circuit 5 preferably controls the switching element Q1 in such a manner that the all the conduction periods Ton of the switching element Q1 approach a predetermined time period. As a result, it becomes possible to further reduce a harmonic component in the input current Iin, and to achieve a yet higher power factor, in the lighting device 10A. A feature wherein the conduction period Ton is constant is not limited to an instance where the lengths of all the conduction periods Ton are strictly equal, but means that the length of the conduction period Ton may exhibit differences, within such range as allows the harmonic component to be reduced.

The control circuit 5 is configured to control the constant current circuit 8. Explained in specific terms, the control unit 12 is configured to control the constant current circuit 8.

Figure 5:
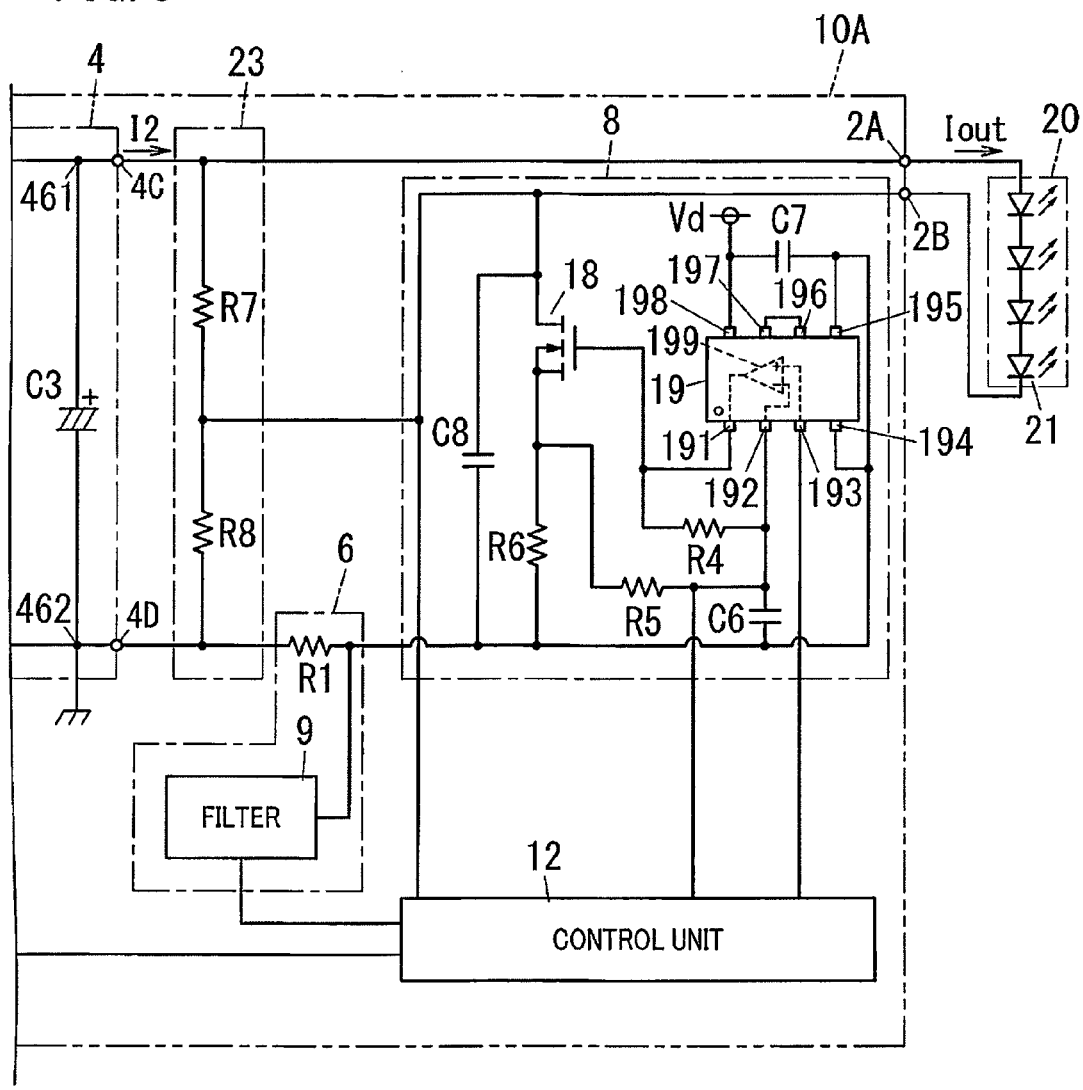
FIG. 5 is an explanatory diagram for explaining a constant current circuit in the lighting device of Embodiment 1.

For instance, the constant current circuit 8 is provided with a varying unit 18 that varies the magnitude of the DC current I2 that is outputted by the conversion circuit 4, and with three resistors R4 to R6 and three capacitors C6 to C8, and an integrated circuit 19 as illustrated in FIG. 5.

The varying unit 18 is, for instance, an enhancement-type n-channel MOSFET.

The integrated circuit 19 is provided with a first connection pin 191, a second connection pin 192, a third connection pin 193, a fourth connection pin 194, a fifth connection pin 195, a sixth connection pin 196, a seventh connection pin 197 and an eighth connection pin 198. The integrated circuit 19 is, for instance, an operational amplifier (commercially available part number: NJM2904, by New Japan Radio Co., Ltd.). The integrated circuit 19 is provided with a first operational amplifier 199 and a second operational amplifier (not shown). In the integrated circuit 19, the first connection pin 191 is an output terminal of a first operational amplifier 199. The second connection pin 192 is an inverting input terminal of the first operational amplifier 199, the third connection pin 193 is a non-inverting input terminal of the first operational amplifier 199, and the fourth connection pin 194 is a negative power source terminal. In the integrated circuit 19, the fifth connection pin 195 is a non-inverting input terminal of the second operational amplifier, the sixth connection pin 196 is an inverting input terminal of the second operational amplifier, the seventh connection pin 197 is an output terminal of the second operational amplifier and the eighth connection pin 198 is a positive power source terminal. The second operational amplifier is not used in the integrated circuit 19. The second operational amplifier is not depicted in FIG. 5. The graphic symbols of the integrated circuit 19 in FIG. 5 denote an operational amplifier (aforementioned part number: NJM2904), by New Japan Radio Co., Ltd.

The first connection pin 191 of the integrated circuit 19 is electrically connected to a gate terminal of an n-channel MOSFET that is used as the varying unit 18. The first connection pin 191 of the integrated circuit 19 is electrically connected to the second connection pin 192 of the integrated circuit 19 via the resistor R4. The first operational amplifier 199 and the resistor R4 make up an error amplifier in the constant current circuit 8. For convenience in the explanation, the n-channel MOSFET that is used as the varying unit 18 may also be referred to as "MOSFET" for short.

The second connection pin 192 of the integrated circuit 19 is electrically connected to a source terminal of the MOSFET, via the resistor R5. The second connection pin 192 of the integrated circuit 19 is electrically connected to the low potential-side terminal 462 of the third capacitor C3 in the conversion circuit 4, via the capacitor C6. The resistor R5 and the capacitor C6 make up a filter circuit in the constant current circuit 8.

The third connection pin 193 of the integrated circuit 19 is electrically connected to the control unit 12.

The fourth connection pin 194 and the fifth connection pin 195 of the integrated circuit 19 are electrically connected to the low potential-side terminal 462 of the third capacitor C3.

The sixth connection pin 196 of the integrated circuit 19 is electrically connected to the seventh connection pin 197 of the integrated circuit 19.

The eighth connection pin 198 of the integrated circuit 19 is electrically connected to a power source circuit (not shown). The power source circuit is configured to output a DC voltage Vd. For instance, the power source circuit may be configured to convert, to the DC voltage Vd, voltage corresponding to the DC current I2 that is outputted by the conversion circuit 4, and to output the DC voltage Vd.

The eighth connection pin 198 of the integrated circuit 19 is electrically connected to the low potential-side terminal 462 of the third capacitor C3, via the capacitor C7.

A drain terminal of the MOSFET (varying unit 18) is electrically connected to the output terminal 2B. The drain terminal of the MOSFET is electrically connected to the low potential-side terminal 462 of the third capacitor C3, via the capacitor C8. Further, the drain terminal of the MOSFET is electrically connected to the control unit 12. The source terminal of the MOSFET is electrically connected to the low potential-side terminal 462 of the third capacitor C3 via the resistor R6.

The conversion circuit 4 is an SEPIC; accordingly, for instance, a ripple component of a period twice that of the AC power source 50 is superimposed on the DC current I2. Preferably, therefore, the lighting device 10A is provided with the constant current circuit 8. Preferably, the control unit 12 in the control circuit 5 controls the varying unit 18 in such a manner that the magnitude of the DC current I2 is made, by the varying unit 18, into a magnitude suitable for the light source 20. That is, the control circuit 5 is configured to control the varying unit 18 in such a manner that the magnitude of the DC current I2 is set to the constant current to the light source 20. Explained in specific terms, the control unit 12 preferably causes the n-channel MOSFET that is used as the varying unit 18 to operate at a region (active region) where the drain current varies proportionally to the change in gate-to-source voltage. In other words, the control unit 12 is preferably configured to cause the n-channel MOSFET that is used as the varying unit 18 to function as a resistor component.

The control unit 12 is configured to output a reference voltage (hereafter, "second reference voltage") to the third connection pin 193 of the integrated circuit 19 in the constant current circuit 8.

The operation of the constant current circuit 8 will be explained next. In the constant current circuit 8, the current Tout flows in a path over the high potential-side terminal 461 of the third capacitor C3, the output terminal 2A, the light source 20, the output terminal 2B, the varying unit 18, the resistor R6, and the low potential-side terminal 462 of the third capacitor C3, when the n-channel MOSFET that is used as the varying unit 18 is in an on-state.

In the constant current circuit 8, voltage is generated across the resistor R6 when the current Tout flows in the resistor R6. In the constant current circuit 8, the voltage across the resistor R6 is applied to the second connection pin 192 of the integrated circuit 19 via the filter circuit (resistor R5 and capacitor C6).

The first operational amplifier 199 in the integrated circuit 19 outputs the output voltage to the varying unit 18 in such a manner that the voltage that is applied to the inverting input terminal and the second reference voltage that is applied to the non-inverting input terminal coincide with each other.

The varying unit 18 makes variable the magnitude of the DC current I2 that is outputted by the conversion circuit 4, on the basis of the magnitude of the output voltage that is outputted by the integrated circuit 19. Explained in specific terms, the gate-to-source voltage in the varying unit 18 varies with changes in the output voltage that is outputted by the integrated circuit 19. As a result, the drain current in the varying unit 18 varies proportionally to changes in the gate-to-source voltage, and hence it becomes possible to vary the magnitude of the DC current I2 that is outputted by the conversion circuit 4. Accordingly, the magnitude of the DC current I2 that is outputted by the conversion circuit 4 in the varying unit 18 i.e. the magnitude of the current Tout that flows in the light source 20, can be brought to a magnitude that is suitable for the light source 20.

In the lighting device 10A, the n-channel MOSFET that is used as the varying unit 18 is made to function as a resistor component, and hence the magnitude of the DC current I2 can be brought, by the varying unit 18, to a magnitude that is suitable for the light source 20. Accordingly, it becomes possible to reduce, in the lighting device 10A, the ripple component in the DC current I2 from the conversion circuit 4. As a result, for instance, flicker radiated by the light source 20 can be suppressed in the lighting device 10A. It becomes also possible to prevent, in the lighting device 10A, for instance, the occurrence of flicker in video images that are captured by an imaging device, such as a video camera, in an environment in which the light source 20 is turned on by the lighting device 10A.

In the example illustrated in the figure, the constant current circuit 8 is configured by being provided with the varying unit 18, the three resistors R4 to R6, the three capacitors C6 to C8, and the integrated circuit 19, but the constant current circuit 8 is not limited to this configuration, and it suffices that the constant current circuit 8 be provided with a series circuit at least with the varying unit 18 and the resistor R6. In the example illustrated in the figure, the lighting device 10A is provided with the constant current circuit 8, but the constant current circuit 8 may be omitted.

In the lighting device 10A, the control unit 12 is configured to control the constant current circuit 8, but the control unit 12 is not limited thereto, and a separate control unit may be configured to control the constant current circuit 8 separately from the control unit 12.

The capacitance of the third capacitor C3 in the lighting device 10A is set to be comparatively large. Accordingly, there is a possibility that it takes a comparatively long time for the charge accumulated in the third capacitor C3 to be discharged, when the AC current I0 from the AC power source 50 is no longer being inputted. As a result, there is a possibility that light from the light source 20 may go on being emitted even when, for instance, the AC current I0 is no longer being inputted from the AC power source 50, in the lighting device 10A. Preferably, therefore, the lighting device 10A is provided with a limiting circuit 23 that is capable of limiting the voltage that is applied to the light source 20. For convenience in the explanation, the time at which the AC current I0 is no longer being inputted from the AC power source 50 will be referred to as "when the AC power source 50 is turned off". The time at which the AC power source 50 is turned off denotes a point in time in which, for instance, the power source switch (not shown) that is connected between the AC power source 50 and the input terminal 1A, or between the AC power source 50 and the input terminal 1B, is switched off.

The limiting circuit 23 is provided with a series circuit of a resistor R7 and a resistor R8. The series circuit of the resistor R7 and the resistor R8 is electrically connected between both ends of the third capacitor C3. In other words, the limiting circuit 23 is connected in parallel to the third capacitor C3.

Preferably, the resistance value of the resistor R7 and the resistance value of the resistor R8 are set in such a manner that the voltage that is applied to the light source 20 is lower than the lighting voltage of the light source 20 when the AC power source 50 is turned off. Preferably, the control unit 12 in the control circuit 5 controls the constant current circuit 8 in such a way so as to stop outputting of the output voltage from the integrated circuit 19 to the varying unit 18 when the AC power source 50 is turned off. The lighting voltage of the light source 20 denotes herein the minimum voltage that enables lighting of the light source 20. When each of the plurality of solid-state light-emitting elements 21 is an LED, for instance, the lighting voltage of the light source 20 is the total forward voltage (forward direction voltage) in the plurality of solid-state light-emitting elements 21.

Explained in specific terms, the control unit 12 is configured to output a pulse signal to the second connection pin 192 of the integrated circuit 19 in the constant current circuit 8 when the AC power source 50 is turned off. The control unit 12 is configured to modify the signal level of the pulse signal from a low level to a high level when the AC power source 50 is turned off. As a result, in the lighting device 10A, it becomes possible to stop the outputting of the output voltage from the integrated circuit 19 to the varying unit 18 when the AC power source 50 is turned off. In the lighting device 10A, the voltage that is applied to the light source 20 can be made lower, by the limiting circuit 23, than the lighting voltage of the light source 20 when the AC power source 50 is turned off. Therefore, it becomes possible to prevent continued emission of light by the light source 20 when the AC power source 50 in the lighting device 10A is turned off. The method for detecting when the AC power source 50 has been turned off by the control unit 12 may involve, for instance, detecting the time at which the voltage that is supplied to the control circuit 5 becomes lower than a specified voltage. The voltage supplied to the control circuit 5 denotes herein the voltage that operates the control circuit 5.

Figure 6:
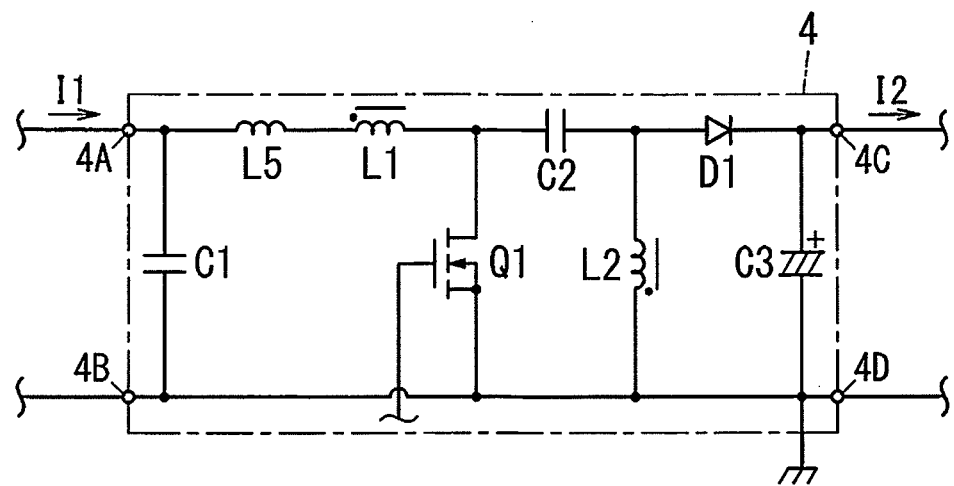
FIG. 6 is a circuit diagram illustrating another conversion circuit in the lighting device of Embodiment 1.

In the lighting device 10A, the first inductor L1 and the second inductor L2 may be mounted on the core of a transformer. In the lighting device 10A, the first inductor L1 and the second inductor L2 are mounted on the core of a transformer, and another inductor L5 may be electrically connected between the first inductor L1 and the first capacitor C1, as illustrated in FIG. 6. The other inductor L5 is an inductor that is different from the first inductor L1 and the second inductor L2.

In the lighting device 10A, a DC/DC converter (not shown) may be electrically connected between the pair of output ends 4C, 4D of the conversion circuit 4 and the pair of output terminals 2A, 2B. In the lighting device 10A, a filter circuit (not shown) may be electrically connected between the pair of output ends 3C, 3D of the rectifier circuit 3, and the pair of input ends 4A, 4B of the conversion circuit 4.

The lighting device 10A explained above is provided with the pair of input terminals 1A, 1B, the pair of output terminals 2A, 2B to which the light source 20 is electrically connected, and the rectifier circuit 3 that subjects the AC current to full-wave rectification. The lighting device 10A is provided with the conversion circuit 4 that converts the pulsating current I1 from the rectifier circuit 3 to the DC current I2, and outputs the DC current I2 to the pair of output terminals 2A, 2B, and with the control circuit 5 that controls the conversion circuit 4. The pair of input terminals 1A, 1B is electrically connected to the pair of input ends 3A, 3B of the rectifier circuit 3. The pair of output ends 3C, 3D of the rectifier circuit 3 is electrically connected to the pair of input ends 4A, 4B of the conversion circuit 4. The conversion circuit 4 is an SEPIC. The conversion circuit 4 is provided with the first capacitor C1 that is connected between the pair of input ends of the conversion circuit 4, and the first series circuit 42 of the first inductor L1 and the switching element Q1 connected between both ends of the first capacitor C1. The conversion circuit 4 is also provided with the second series circuit 43, of the second capacitor C2 and the second inductor L2, connected between the first main terminal 451 and the second main terminal 452 of the switching element Q1. The conversion circuit 4 is provided with the third series circuit 44, of the diode D1 and the third capacitor C3, connected between both ends of the second inductor L2. The third capacitor C3 is connected between the pair of output ends 4C, 4D of the conversion circuit 4. The pair of output terminals 2A, 2B is electrically connected to the pair of output ends 4C, 4D of the conversion circuit 4. The inductance of the first inductor L1 is set so as to make the time period T1, during which the diode D1 is electrically conducted, shorter than the half period of the resonance period of the closed loop circuit that includes the first capacitor C1, the first inductor L1, the second capacitor C2 and the third capacitor C3. The inductance of the second inductor L2 is set so that make the time period, during which the diode D1 is electrically conducted, shorter than the half period of the resonance period of the closed loop circuit. The control circuit 5 controls the switching element Q1 in such a manner that the switching element Q1 is turned on at each fixed period T.

In other words, the lighting device 10A explained above is for providing power from the AC power source 50 to turn on the light source 20. The lighting device 10A is provided with the pair of input terminals 1A, 1B, the pair of output terminals 2A, 2B, the rectifier circuit 3, the conversion circuit 4, and the control circuit 5. The AC power source 50 that outputs the AC current I0 is electrically connected to the pair of input terminals 1A, 1B. The light source 20 is electrically connected to the pair of output terminals 2A, 2B. In other words, the rectifier circuit 3 is configured to generate the pulsating current I1 through full-wave rectification of the AC current I0. The conversion circuit 4 is configured to convert the pulsating current I1 from the rectifier circuit 3 to the DC current I2, and to output the DC current I2 to the pair of output terminals 2A, 2B. The control circuit 5 is configured to control the conversion circuit 4. The rectifier circuit 3 is provided with the pair of first input ends (pair of input ends 3A, 3B) and the pair of first output ends (pair of output ends 3C, 3D). The pair of first input ends is electrically connected to the pair of input terminals 1A, 1B, respectively. The pair of first output ends is electrically connected to the conversion circuit 4. The conversion circuit 4 is an SEPIC. The conversion circuit 4 is provided with the pair of second input ends (pair of input ends 4A, 4B), the pair of second output ends (pair of output ends 4C, 4D), the first capacitor C1, the first series circuit 42, the second series circuit 43 and the third series circuit 44. The pair of second input ends is electrically connected to the pair of first output ends of the rectifier circuit 3, respectively. The pair of second output ends is electrically connected to the pair of output terminals 2A, 2B, respectively. The first capacitor C1 is connected between the pair of second input ends. The first series circuit 42 includes the first inductor L1 and the switching element Q1 connected in series, and is connected in parallel to the first capacitor C1. The second series circuit 43 includes the second capacitor C2 and the second inductor L2 connected in series, and is connected in parallel to the switching element Q1. The third series circuit 44 includes the diode D1 and the third capacitor C3 connected in series, and is connected in parallel to the second inductor L2. The third capacitor C3 is connected between the pair of second output ends. The first inductor L1 has an inductance such that the time period T1, during which the diode D1 is electrically conducted, is made shorter than the half period of the resonance period of the closed loop circuit. The second inductor L2 has an inductance such that the time period T1, during which the diode D1 is electrically conducted, is made shorter than the half period of the resonance period of the closed loop circuit. The closed loop circuit includes the first capacitor C1, the first inductor L1, the second capacitor C2 and the third capacitor C3. The control circuit 5 is configured to control the switching element Q1 in such a manner that the switching element Q1 is turned on at fixed periods T.

As a result, the capacitances of the first capacitor C1 and the second capacitor C2 in the lighting device 10A can be set to be comparatively small. As a result, it becomes possible to suppress oscillation of the current Ia flowing in the first inductor L1, during the conduction period T1 of the diode D1. The stability of the operation of the lighting device 10A can be accordingly enhanced while improving the power factor.

Preferably, the inductance of the first inductor L1 is set to be larger than the inductance of the second inductor L2. As a result, it becomes possible to suppress oscillation of the current Ia that flows in the first inductor L1 during the conduction period T1 of the diode D1, and to turn on the switching element Q1 after the current Id flowing in the diode D1 reaches zero, in the lighting device 10A. Accordingly, the stability of the operation of the lighting device 10A can be enhanced while improving the power factor.

Preferably, the control circuit 5 controls the switching element Q1 in such a manner that the conduction period Ton of the switching element Q1 is constant. In other words, the control circuit 5 is preferably configured to control the switching element Q1 in such a manner that a plurality of conduction periods Ton, during which the switching element Q1 is electrically conducted, is constant. It becomes as a result possible to further reduce a harmonic component in the input current Iin, and to achieve a yet higher power factor, in the lighting device 10A.

Preferably, the control circuit 5 is provided with the driving unit 11 and the control unit 12. The driving unit 11 is configured to drive the switching element Q1. The control unit 12 is configured to control the driving unit 11. The control unit 12 is provided with the generating unit 14. The generating unit 14 is configured to generate the control signal S1 for controlling the driving unit 11. The control unit 12 is configured to output the control signal S1, generated by the generating unit 14, to the driving unit 11. The driving unit 11 is configured to drive the switching element Q1 according to the control signal S1 from the control unit 12. The generating unit 14 is configured to generate, as the control signal S1, a signal for controlling the driving unit 11 in such a manner that the switching element Q1 is turned on at fixed periods T.

Figure 7:
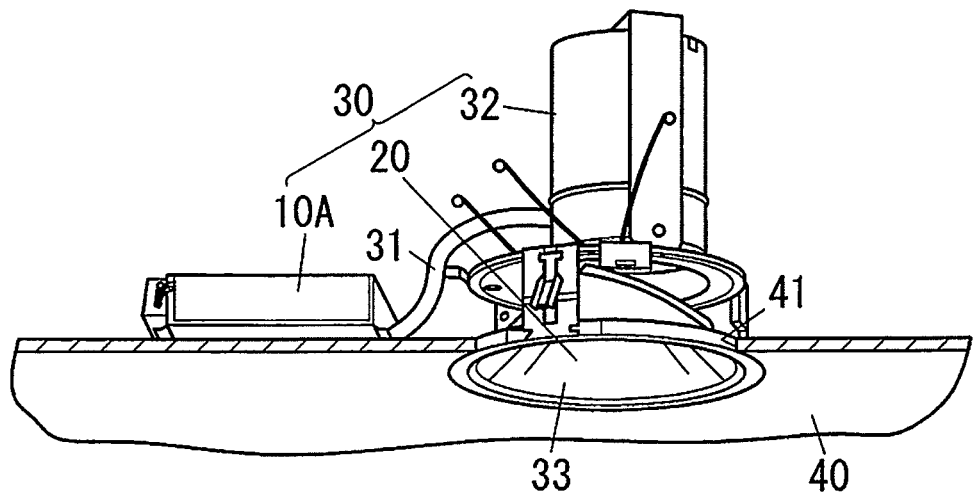
FIG. 7 is a partial cutaway schematic perspective-view diagram of the lighting fixture provided with the lighting device of Embodiment 1 in a construction state.

A lighting fixture 30 provided with the lighting device 10A will be explained next with reference to FIG. 7.

The lighting fixture 30 is, for instance, a downlight. The lighting fixture 30 is configured, for instance, to be disposed in a ceiling material 40. Explained in specific terms, the lighting fixture 30 is configured, for instance, to be disposed embedded in a hole 41 that is formed in the ceiling material 40.

The lighting fixture 30 is provided with, for instance, the lighting device 10A, the light source 20, a connecting line 31 and a fixture body 32.

The light source 20 is provided with a reflective plate 33 that reflects light emitted by the plurality of solid-state light-emitting elements 21.

The lighting device 10A is electrically connected to the light source 20 (plurality of solid-state light-emitting elements 21) via the connecting line 31.

The light source 20 is mounted on the fixture body 32. Explained in specific terms, the fixture body 32 is configured so that the light source 20 is mounted thereon.

In the example illustrated in the figure, the fixture body 32 is configured so that the light source 20 is mounted on the fixture body 32, but the latter is not limited to this configuration. The fixture body 32 may be configured so that the lighting device 10A and the light source 20 are mounted on the fixture body 32. In the example illustrated in the figure, specifically, the lighting fixture 30 is a lighting fixture of separate power supply type in which the lighting device 10A and the light source 20 are disposed separately, but the lighting fixture 30 is not limited thereto. The lighting fixture 30 may be a lighting fixture of integrated power supply type in which the lighting device 10A and the light source 20 are mounted on the fixture body 32.

The lighting fixture 30 is not limited to a downlight, and may be, for instance, a ceiling light, a spotlight or the like.

The lighting fixture 30 explained above is provided with the lighting device 10A and the light source 20 that can be turned on by the lighting device 10A. In the lighting fixture 30, therefore, a lighting fixture can be provided that has the lighting device 10A the stability of operation whereof can be enhanced while improving the power factor.

Embodiment 2

Figure 8:
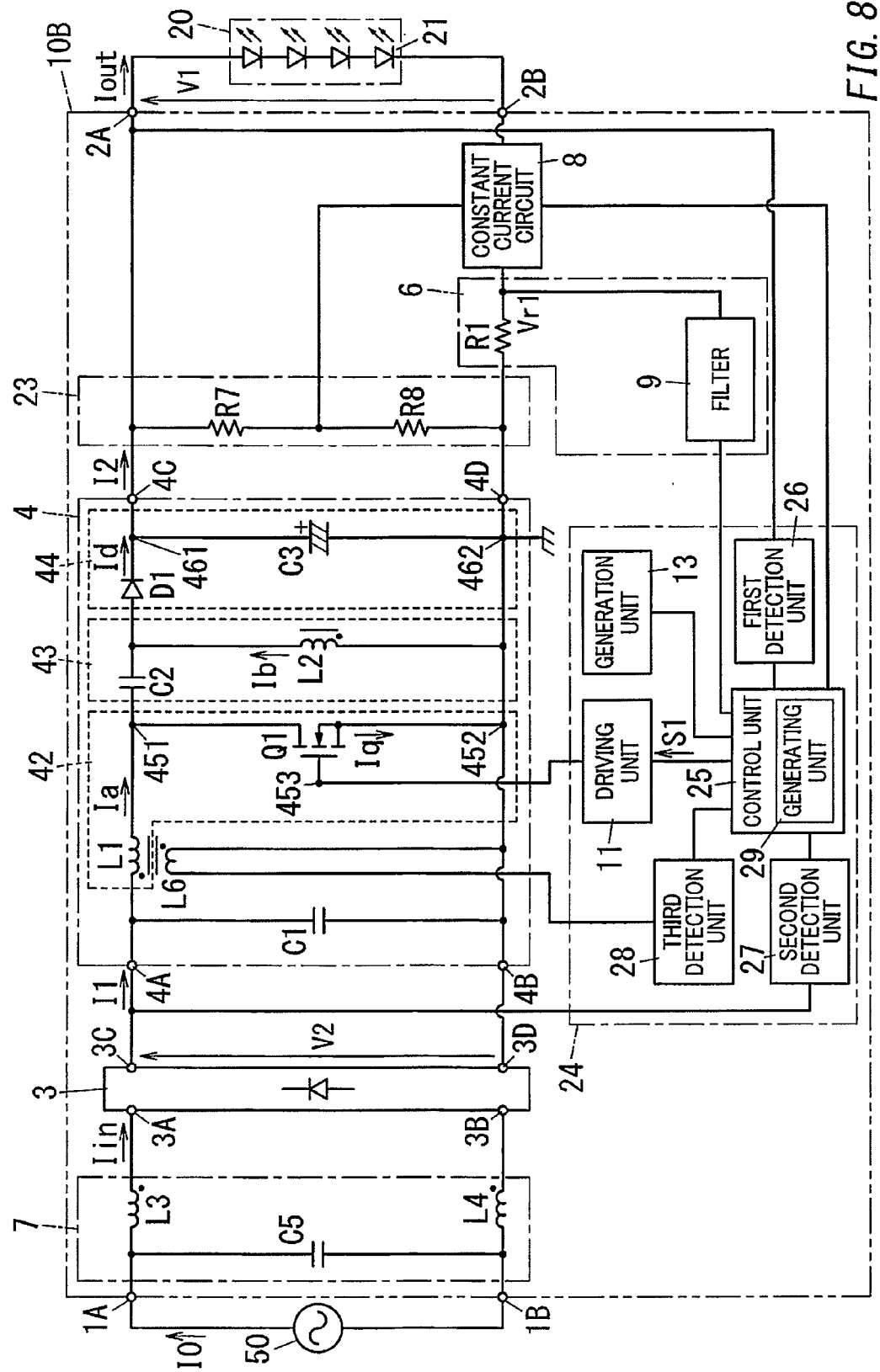
FIG. 8 is a circuit block diagram of a lighting fixture that is provided with a lighting device of Embodiment 2.

The basic configuration of a lighting device 10B of Embodiment 2 is identical to that of the lighting device 10A (FIG. 1) of Embodiment 1. As illustrated in FIG. 8, the lighting device 10B differs from the lighting device 10A in that, for instance, the lighting device 10B is provided with a control circuit 24 the configuration of which is different from that of the control circuit 5 of the lighting device 10A. In the lighting device 10B, constituent elements identical to those of the lighting device 10A will be denoted by the same reference symbols, and an explanation thereof will be omitted as appropriate.

The first inductor L1 in the conversion circuit 4 is a primary winding of a transformer. The transformer is provided with an inductor L6 that is a secondary winding magnetically coupled to the primary winding that is made up of the first inductor L1.

Similarly to the control circuit 5 of the lighting device 10A, the control circuit 24 is configured to control the conversion circuit 4 and the constant current circuit 8.

The control circuit 24 is provided with the driving unit 11, a control unit (controller) 25, the generation unit 13, a first detection unit (first detector) 26, a second detection unit (second detector) 27 and a third detection unit (third detector) 28.

The control unit 25 is, for instance, a micro-computer. The control unit 25 is configured to control the driving unit 11. Explained in specific terms, the control unit 25 is configured to output, to the driving unit 11, the control signal S1 for controlling the driving unit 11. The control signal S1 is, for instance, a PWM signal. In the control circuit 24, a micro-computer is used as the control unit 25, but the control circuit 24 is not limited thereto, and, for instance, a control IC or the like may be used as the control circuit 24. The control circuit 24 is provided with the driving unit 11, the control unit 25, the generation unit 13, the first detection unit 26, the second detection unit 27 and the third detection unit 28, but is not limited to this configuration.

The control unit 25 is provided with a generating unit (generating circuit) 29.

Similarly to the generating unit 14 of the lighting device 10A, the generating unit 29 is configured to generate the above first control signal as the control signal S1.

The generating unit 29 is configured to generate a difference voltage across the first reference voltage Vt1 and the detected voltage Vr1 that is detected by the detection circuit 6. The generating unit 29 is configured to generate, as the control signal S1, a second control signal having an on-time period of the switching element Q1, on the basis of the difference voltage.

The first detection unit 26 is configured to detect the voltage (hereafter, "first voltage") V1 that is applied to the light source 20. The first detection unit 26 is, for instance, a resistor divider.

The second detection unit 27 is configured to detect the voltage (hereafter, "second voltage") V2 across the pair of output ends 3C, 3D of the rectifier circuit 3. The second detection unit 27 is, for instance, a resistor divider.

The third detection unit 28 is configured to detect that the current value of the current Id flowing in the diode D1 lies within a predetermined range. Explained by way of example, the third detection unit 28 is configured to detect that the current value of the current Id flowing in the diode D1 is zero. The third detection unit 28 need not be configured to detect that the current value of the current Id flowing in the diode D1 is strictly zero, and may be configured to detect that the current value of the current Id takes on value within a predetermined range that includes zero. The third detection unit 28 is electrically connected to a first end of the inductor L6. A second end of the inductor L6 is electrically connected to the low potential-side terminal 462 of the third capacitor C3 in the conversion circuit 4. By way of magnetic coupling between the inductors L1 and L6, the third detection unit 28 detects the current value of the current Id.

The inventors of the present application devised the lighting device of Comparative example 2, which is provided with a control circuit that is different from the control circuit 24. The lighting device of Comparative example 2 differs from the lighting device 10B only as regards the control circuit.

The control circuit is provided with the driving unit 11, the third detection unit 28, and a control unit (controller) that has only the generating unit 29. The control unit is configured to output to the driving unit 11, as the control signal S1, the second control signal generated by the generating unit 29, when the third detection unit 28 detects that the current value of the current Id lies within a predetermined range.

Figure 9:
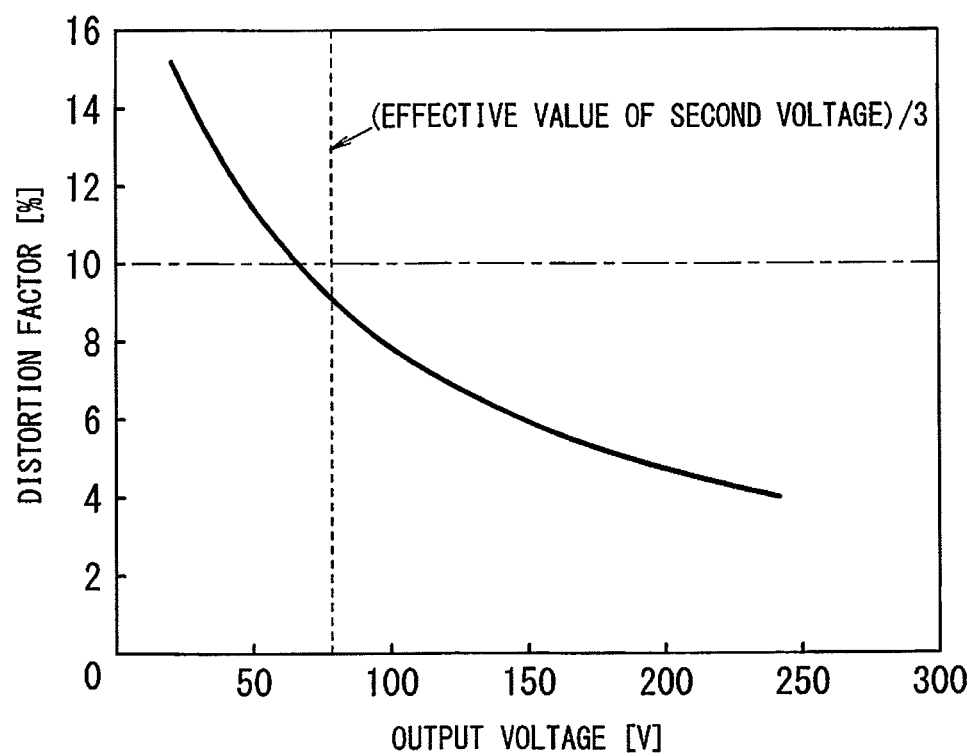
FIG. 9 is a correlation diagram of output voltage of a conversion circuit and a distortion factor of a fifth harmonic component in input current of a rectifier circuit, in the lighting device of Embodiment 2.

The inventors of the present application arrived at a result whereby, in the lighting device of the Comparative example 2, a correlation such as the one illustrated in FIG. 9 exists between the output voltage of the conversion circuit and a distortion factor of a fifth harmonic component in the input current of the rectifier circuit. The inventors of the present application deemed that, in the lighting device of Comparative example 2, the fifth harmonic component in the input current of the rectifier circuit is difficult to reduce when the output voltage of the conversion circuit is smaller than {(effective value of the second voltage)/3}. The dashed line in FIG. 9 denotes the relative limit value of a fifth harmonic component in a lighting fixture (class C) pursuant to JIS C61000-3-2:2011. The conversion circuit and the rectifier circuit of Comparative example 2 are identical to the conversion circuit 4 and the rectifier circuit 3 of the lighting device 10B, respectively.

The inventors of the present application deemed that there is a possibility that the loss of the switching element Q1 increases, and the conversion efficiency of the conversion circuit 4 drops below that in the lighting device of Comparative example 2, at the timing at which the switching element Q1 is brought from an off-state to an on-state, in the lighting device 10A of Embodiment 1.

The control circuit 24 is configured to control the switching element Q1 on the basis of the magnitude relation between the first voltage V1 and the second voltage V2.

Explained in specific terms, the control unit 25 is configured to control the driving unit 11 on the basis of the magnitude relation between the first voltage V1 and the second voltage V2.

The control unit 25 is configured to output to the driving unit 11, as the control signal S1, the first control signal that is generated by the generating unit 14, when the first voltage V1 and the second voltage V2 satisfy the relationship in Expression (2) below.

(Voltage value of the first voltage $V1$)≤{(effective value of the second voltage $V2$)/3}   Expression (2)

In the lighting device 10B, when the first voltage V1 and the second voltage V2 satisfy the relationship of Expression (2), the harmonic component in the input current Iin can be reduced further, and a yet higher power factor can be obtained, than in the lighting device of Comparative example 2.

The control unit 25 is configured to control the driving unit 11 in accordance with the detection result of the third detection unit 28 when the first voltage V1 and the second voltage V2 satisfy the relationship of Expression (3) below. For instance, the control unit 25 is configured to output to the driving unit 11, as the control signal S1, the second control signal generated by the generating unit 29, upon detection, by the third detection unit 28, that the current value of the current Id lies within the predetermined range, when the first voltage V1 and the second voltage V2 satisfy the relationship of Expression (3) below.

(Voltage value of the first voltage $V1$)>{(effective value of the second voltage $V2$)/3}   Expression (3)

In the lighting device 10B, the control circuit 24 controls the switching element Q1 by way of driving unit 11 in accordance with the detection result of the third detection unit 28, when the first voltage V1 and the second voltage V2 satisfy the relationship of Expression (3). Therefore, it becomes possible to suppress drops in the conversion efficiency of the conversion circuit 4.

In the lighting device 10B, therefore, the control circuit 24 controls the switching element Q1 on the basis of the magnitude relation between the first voltage V1 and the second voltage V2, and hence a yet higher power factor can be obtained, when the output voltage of the conversion circuit 4 is comparatively small. In the lighting device 10B, the control circuit 24 controls the switching element Q1 on the basis of the magnitude relation between the first voltage V1 and the second voltage V2. Therefore, drops in the conversion efficiency of the conversion circuit 4 can be suppressed, when the output voltage of the conversion circuit 4 is comparatively high.

The lighting device 10B may be used in, for instance, the lighting fixture 30 of Embodiment 1.

In the lighting device 10B explained above, the control circuit 24 is provided with the driving unit 11 that drives the switching element Q1, the control unit 25 that controls the driving unit 11, and the first detection unit 26 that detects the first voltage V1, being the voltage that is applied to the light source 20. The control circuit 24 is provided with the second detection unit 27 that detects the second voltage V2, being the voltage across the pair of output ends 3C, 3D of the rectifier circuit 3, and the third detection unit 28 that detects that the current value of the current Id flowing in the diode D1 takes on a value lying within a predetermined range. The control unit 25 is provided with the generating unit 29 that is configured to generate the control signal S1 for controlling the driving unit 11. The control unit 25 is configured to output the control signal S1, generated by the generating unit 29, to the driving unit 11. The generating unit 29 is configured to generate the control signal (first control signal) S1 for turning on the switching element Q1, at each fixed period T. The control unit 25 is configured to output, to the driving unit 11, the control signal (first control signal) S1 that is generated by the generating unit 29, when the first voltage V1 and the second voltage V2 satisfy the relationship (voltage value of first voltage V1)≤{(effective value of the second voltage V2)/3}. The control unit 25 controls the driving unit 11 in such a manner that the driving unit 11 drives the switching element Q1 in accordance with the detection result of the third detection unit 28, when the first voltage V1 and the second voltage V2 satisfy the relationship (voltage value of the first voltage V1)>{(effective value of the second voltage V2)/3}.

In other words, the control circuit 24 in the lighting device 10B explained above is provided with the driving unit 11 and the control unit 25. The driving unit 11 is configured to drive the switching element Q1. The control unit 25 is configured to control the driving unit 11. The control unit 25 is provided with the generating unit 29. The generating unit 29 is configured to generate the control signal S1 for controlling the driving unit 11. The control unit 25 is configured to output the control signal S1, generated by the generating unit 29, to the driving unit 11. The driving unit 11 is configured to drive the switching element Q1 according to the control signal S1 from the control unit 25. The generating unit 29 is configured to generate, as the control signal S1, a signal for controlling the driving unit 11 so as to turn on the switching element Q1 at fixed periods T.

Preferably, the control circuit 24 is further provided with the first detection unit 26, the second detection unit 27 and the third detection unit 28. The first detection unit 26 is configured to detect the first voltage V1, which is the voltage that is applied to the light source 20. The second detection unit 27 is configured to detect the second voltage V2, which is the voltage across the pair of first output ends (pair of output ends 3C, 3D) of the rectifier circuit 3. The third detection unit 28 is configured to detect that the current value of the current Id flowing in the diode D1 lies within a predetermined range. The control unit 25 is configured to output, to the driving unit 11, the control signal S1 that is generated by the generating unit 14, when the first voltage V1 and the second voltage V2 satisfy the relationship (voltage value of the first voltage V1)≤{(effective value of the second voltage V2)/3}. The control unit 25 controls the driving unit 11 in such a manner that the driving unit 11 drives the switching element Q1 in accordance with the detection result of the third detection unit 28, when the first voltage V1 and the second voltage V2 satisfy the relationship (voltage value of the first voltage V1)>{(effective value of the second voltage V2)/3}.

In the lighting device 10B, as a result, a yet higher power factor can be obtained, when the output voltage of the conversion circuit 4 is comparatively low, and drops in the conversion efficiency of the conversion circuit 4 can be suppressed when the output voltage of the conversion circuit 4 is comparatively high.

More preferably, the generating unit 29 is configured to generate, as the control signal S1, a signal for setting the time period Ton, during which the switching element Q1 is electrically conducted, on the basis of the difference voltage across the first reference voltage Vt1 and the detected voltage Vr1 corresponding to the current Tout that flows in the light source 20. The control unit 25 is configured to output, to the driving unit 11, the control signal S1 that is generated by the generating unit 29, upon detection, by the third detection unit 28, that the current value of the current Id flowing in the diode D1 lies within the predetermined range, when the first voltage V1 and the second voltage V2 satisfy the relationship (voltage value of the first voltage V1)>{(effective value of the second voltage V2)/3}.

As shown in Embodiments 1 and 2 described above, a lighting device (10A; 10B) according to the first aspect of the present disclosure is for providing power from an AC power source (50) to turn on a light source (20). The lighting device (10A; 10B) includes a pair of input terminals (1A, 1B), a pair of output terminals (2A, 2B), a rectifier circuit (3), a conversion circuit (4), and a control circuit (5; 24). The AC power source (50) is configured to output an AC current (I0) and may be electrically connected to the pair of input terminals (1A, 1B). The light source (20) may be electrically connected to the pair of output terminals (2A, 2B). The rectifier circuit (3) is configured to generate a pulsating current (I1) by full-wave rectification of the AC current (I0). The conversion circuit (4) is configured to convert the pulsating current (I1) from the rectifier circuit (3) into a DC current (I2), and to output the DC current (I2) to the pair of output terminals (2A, 2B). The control circuit (5; 24) is configured to control the conversion circuit (4). The rectifier circuit (3) includes a pair of first input ends and a pair of first output ends. The pair of first input ends is electrically connected to the pair of input terminals (1A, 1B), respectively. The pair of first output ends are electrically connected to the conversion circuit (4). The conversion circuit (4) is an SEPIC. The conversion circuit (4) includes a pair of second input ends, a pair of second output ends, a first capacitor (C1), a first series circuit (42), a second series circuit (43), and a third series circuit (44). The pair of second input ends are electrically connected to the pair of first output ends of the rectifier circuit (3), respectively. The pair of second output ends are electrically connected to the pair of output terminals (2A, 2B), respectively. The first capacitor (C1) is connected between the pair of second input ends. The first series circuit (42) includes a first inductor (L1) and a switching element (Q1), which are connected in series, and is connected in parallel to the first capacitor (C1). The second series circuit (43) includes a second capacitor (C2) and a second inductor (L2), which are connected in series, and is connected in parallel to the switching element (Q1). The third series circuit (44) includes a diode (D1) and a third capacitor (C3), which are connected in series, and is connected in parallel to the second inductor (L2). The third capacitor (C3) is connected between the pair of second output ends. The first inductor (L1) and the second inductor (L2) have inductances by which a time period (T1), during which the diode (D1) is electrically connected, is made shorter than a half period of a resonance period of a closed loop circuit that comprises the first capacitor (C1), the first inductor (L1), the second capacitor (C2) and the third capacitor (C3). The control circuit (5; 24) is configured to control the switching element (Q1) in such a manner that the switching element (Q1) is turned on at fixed periods (T).

In the lighting device (10A; 10B) according to the first aspect, the capacitances of the first capacitor (C1) and the second capacitor (C2) can be set to be comparatively small. As a result, it becomes possible to suppress oscillation of the current (Ia) flowing in the first inductor (L1), during the conduction period (T1) of the diode (D1). The stability of the operation of the lighting device (10A; 10B) can be accordingly enhanced while improving the power factor.

In the lighting device (10A; 10B) according to the second aspect of the present disclosure realized in combination with the first aspect, the inductance of the first inductor (L1) is larger than the inductance of the second inductor (L2).

In the lighting device (10A; 10B) according to the second aspect, it becomes possible to suppress oscillation of the current (Ia) that flows in the first inductor (L1) during the conduction period (T1) of the diode (D1), and to turn on the switching element (Q1) after the current (Id) flowing in the diode (D1) reaches zero. Accordingly, the stability of the operation of the lighting device (10A; 10B) can be enhanced while improving the power factor.

In the lighting device (10A; 10B) according to the third aspect of the present disclosure in combination with the first or second aspects, the control circuit (5; 24) is configured to control the switching element (Q1) in such a manner that a plurality of conduction periods (Ton), during which the switching element (Q1) is electrically conducted, are constant.

In the lighting device (10A; 10B) according to the third aspect, it becomes possible to further reduce a harmonic component in the input current (Iin), and to achieve a yet higher power factor.

In the lighting device (10A; 10B) according to the fourth aspect of the present disclosure in combination with any one of the first to third aspects, the control circuit (5; 24) includes a driving unit (11) (driving circuit) and a control unit (12; 25) (controller). The driving unit (11) is configured to drive the switching element (Q1). The control unit (12; 25) is configured to control the driving unit (11). The control unit (12; 25) includes a generating unit (14; 29) (generating circuit). The generating unit (14; 25) is configured to generate a control signal (S1) for controlling the driving unit (11). The control unit (12; 25) is configured to output, to the driving unit (11), the control signal (S1) generated by the generating unit (14; 29). The driving unit (11) is configured to drive the switching element (Q1) according to the control signal (S1) from the control unit (12; 25). The generating unit (14; 29) is configured to generate, as the control signal (S1), a signal for controlling the driving unit (11) so as to turn on the switching element (Q1) at the fixed periods (T).

In the lighting device (10B) according to the fifth aspect of the present disclosure in combination with the fourth aspect, the control circuit (24) further includes a first detection unit (26) (first detector), a second detection unit (27) (second detector), and a third detection unit (28) (third detector). The first detection unit (26) is configured to detect a first voltage (V1), which is a voltage that is applied to the light source (20). The second detection unit (27) is configured to detect a second voltage (V2), which is a voltage across the pair of first output ends of the rectifier circuit (3). The third detection unit (28) is configured to detect that a current value of a current (Id) flowing in the diode (D1) is within a predetermined range. The control unit (25) is configured to output, to the driving unit (11), the control signal (S1) generated by the generating unit (29), when the first voltage (V1) and the second voltage (V2) satisfy a relationship (voltage value of the first voltage (V1))≤{(effective value of the second voltage (V2))/3}. The control unit (25) is configured to control the driving unit (11) in such a manner that the driving unit (11) drives the switching element (Q1) in accordance with a detection result of the third detection unit (28), when the first voltage (V1) and the second voltage (V2) satisfy a relationship (voltage value of the first voltage (V1))>{(effective value of the second voltage (V2))/3}.

In the lighting device (10B) according to the fifth aspect, a yet higher power factor can be obtained, when the output voltage of the conversion circuit (4) is comparatively low, and drops in the conversion efficiency of the conversion circuit (4) can be suppressed when the output voltage of the conversion circuit (4) is comparatively high.

In the lighting device (10B) according to the sixth aspect of the present disclosure in combination with the fifth aspect, the generating unit (29) is configured to generate, as the control signal (S1), a signal for setting a time period (Ton), during which the switching element (Q1) is electrically conducted, based on a difference voltage across a first reference voltage (Vt1) and a detected voltage (Vr1) corresponding to a current (Tout) that flows in the light source (20). The control unit (25) is configured to output, to the driving unit (11), the control signal (S1) that is generated by the generating unit (29), upon detection, by the third detection unit (28), that a current value of the current (Id) flowing in the diode (D1) is within the predetermined range, when the first voltage (V1) and the second voltage (V2) satisfy a relationship (voltage value of the first voltage (V1))>{(effective value of the second voltage (V2))/3}.

A lighting fixture (30) according to the seventh aspect of the present disclosure, includes: the lighting device (10A; 10B) according to any one of the first to sixth aspects; and the light source (20) that can be turned on by the lighting device (10A; 10B).

In the lighting fixture (30) according to the seventh aspect, a lighting fixture can be provided that has the lighting device (10A) the stability of operation whereof can be enhanced while improving the power factor.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device for providing power from an AC power source to turn on a light source, comprising:
a pair of input terminals to which the AC power source configured to output an AC current may be electrically connected;
a pair of output terminals to which the light source may be electrically connected;
a rectifier circuit configured to generate a pulsating current by full-wave rectification of the AC current;
a conversion circuit configured to convert the pulsating current from the rectifier circuit into a DC current, and to output the DC current to the pair of output terminals; and
a control circuit configured to control the conversion circuit,
wherein the rectifier circuit comprises:
a pair of first input ends electrically connected to the pair of input terminals, respectively; and
a pair of first output ends electrically connected to the conversion circuit,
wherein the conversion circuit is a single-ended primary inductance converter,
wherein the conversion circuit comprises:
a pair of second input ends electrically connected to the pair of first output ends of the rectifier circuit, respectively;
a pair of second output ends electrically connected to the pair of output terminals, respectively;
a first capacitor connected between the pair of second input ends;
a first series circuit comprising a first inductor and a switching element, which are connected in series, and being connected in parallel to the first capacitor;
a second series circuit comprising a second capacitor and a second inductor, which are connected in series, and being connected in parallel to the switching element; and
a third series circuit comprising a diode and a third capacitor, which are connected in series, and being connected in parallel to the second inductor,
wherein the third capacitor is connected between the pair of second output ends,
wherein the first inductor and the second inductor have inductances by which a time period, during which the diode is electrically connected, is made shorter than a half period of a resonance period of a closed loop circuit that comprises the first capacitor, the first inductor, the second capacitor and the third capacitor, and
wherein the control circuit is configured to control the switching element in such a manner that the switching element is turned on at fixed periods.

2. The lighting device according to claim 1, wherein the inductance of the first inductor is larger than the inductance of the second inductor.

3. The lighting device according to claim 1, wherein the control circuit is configured to control the switching element in such a manner that a plurality of conduction periods, during which the switching element is electrically conducted, are constant.

4. The lighting device according to claim 1, wherein the control circuit comprises:
a driving circuit configured to drive the switching element; and
a controller configured to control the driving circuit,
wherein the controller comprises a generating circuit configured to generate a control signal for controlling the driving circuit,
wherein the controller is configured to output, to the driving circuit, the control signal generated by the generating circuit,
wherein the driving circuit is configured to drive the switching element according to the control signal from the controller, and
wherein the generating circuit is configured to generate, as the control signal, a signal for controlling the driving circuit so as to turn on the switching element at the fixed periods.

5. The lighting device according to claim 4, wherein the control circuit further comprises:
a first detector configured to detect a first voltage, which is a voltage that is applied to the light source;
a second detector configured to detect a second voltage, which is a voltage across the pair of first output ends of the rectifier circuit; and
a third detector configured to detect that a current value of a current flowing in the diode is within a predetermined range,
wherein the controller is configured to output, to the driving circuit, the control signal generated by the generating circuit, when the first voltage and the second voltage satisfy a relationship (voltage value of the first voltage)≤{(effective value of the second voltage)/3}, and
wherein the controller is configured to control the driving circuit in such a manner that the driving circuit drives the switching element in accordance with a detection result of the third detector, when the first voltage and the second voltage satisfy a relationship (voltage value of the first voltage)>{(effective value of the second voltage)/3}.

6. The lighting device according to claim 5,
wherein the generating circuit is configured to generate, as the control signal, a signal for setting a time period, during which the switching element is electrically conducted, based on a difference voltage across a first reference voltage and a detected voltage corresponding to a current that flows in the light source, and
wherein the controller is configured to output, to the driving circuit, the control signal that is generated by the generating circuit, upon detection, by the third detector, that a current value of the current flowing in the diode is within the predetermined range, when the first voltage and the second voltage satisfy a relationship (voltage value of the first voltage)>{(effective value of the second voltage)/3}.

7. The lighting device according to claim 2,
wherein the control circuit is configured to control the switching element in such a manner that a plurality of conduction periods, during which the switching element is electrically conducted, are constant.

8. The lighting device according to claim 2,
wherein the control circuit comprises:
a driving circuit configured to drive the switching element; and
a controller configured to control the driving circuit,
wherein the controller comprises a generating circuit configured to generate a control signal for controlling the driving circuit,
wherein the controller is configured to output, to the driving circuit, the control signal generated by the generating circuit,
wherein the driving circuit is configured to drive the switching element according to the control signal from the controller, and
wherein the generating circuit is configured to generate, as the control signal, a signal for controlling the driving circuit so as to turn on the switching element at the fixed periods.

9. The lighting device according to claim 3,
wherein the control circuit comprises:
a driving circuit configured to drive the switching element; and
a controller configured to control the driving circuit,
wherein the controller comprises a generating circuit configured to generate a control signal for controlling the driving circuit,
wherein the controller is configured to output, to the driving circuit, the control signal generated by the generating circuit,
wherein the driving circuit is configured to drive the switching element according to the control signal from the controller, and
wherein the generating circuit is configured to generate, as the control signal, a signal for controlling the driving circuit so as to turn on the switching element at the fixed periods.

10. The lighting device according to claim 7,
wherein the control circuit comprises:
a driving circuit configured to drive the switching element; and
a controller configured to control the driving circuit,
wherein the controller comprises a generating circuit configured to generate a control signal for controlling the driving circuit,
wherein the controller is configured to output, to the driving circuit, the control signal generated by the generating circuit,
wherein the driving circuit is configured to drive the switching element according to the control signal from the controller, and
wherein the generating circuit is configured to generate, as the control signal, a signal for controlling the driving circuit so as to turn on the switching element at the fixed periods.

11. The lighting device according to claim 8,
wherein the control circuit further comprises:
a first detector configured to detect a first voltage, which is a voltage that is applied to the light source;
a second detector configured to detect a second voltage, which is a voltage across the pair of first output ends of the rectifier circuit; and
a third detector configured to detect that a current value of a current flowing in the diode is within a predetermined range,
wherein the controller is configured to output, to the driving circuit, the control signal generated by the generating circuit, when the first voltage and the second voltage satisfy a relationship (voltage value of the first voltage)≤{(effective value of the second voltage)/3}, and
wherein the controller is configured to control the driving circuit in such a manner that the driving circuit drives the switching element in accordance with a detection result of the third detector, when the first voltage and the second voltage satisfy a relationship (voltage value of the first voltage)>{(effective value of the second voltage)/3}.

12. The lighting device according to claim 9,
wherein the control circuit further comprises:
a first detector configured to detect a first voltage, which is a voltage that is applied to the light source;
a second detector configured to detect a second voltage, which is a voltage across the pair of first output ends of the rectifier circuit; and
a third detector configured to detect that a current value of a current flowing in the diode is within a predetermined range,
wherein the controller is configured to output, to the driving circuit, the control signal generated by the generating circuit, when the first voltage and the second voltage satisfy a relationship (voltage value of the first voltage)≤{(effective value of the second voltage)/3}, and
wherein the controller is configured to control the driving circuit in such a manner that the driving circuit drives the switching element in accordance with a detection result of the third detector, when the first voltage and the second voltage satisfy a relationship (voltage value of the first voltage)>{(effective value of the second voltage)/3}.

13. The lighting device according to claim 10,
wherein the control circuit further comprises:
a first detector configured to detect a first voltage, which is a voltage that is applied to the light source;
a second detector configured to detect a second voltage, which is a voltage across the pair of first output ends of the rectifier circuit; and a third detector configured to detect that a current value of a current flowing in the diode is within a predetermined range, wherein the controller is configured to output, to the driving circuit, the control signal generated by the generating circuit, when the first voltage and the second voltage satisfy a relationship (voltage value of the first voltage)≤{(effective value of the second voltage)/3}, and wherein the controller is configured to control the driving circuit in such a manner that the driving circuit drives the switching element in accordance with a detection result of the third detector, when the first voltage and the second voltage satisfy a relationship (voltage value of the first voltage)>{(effective value of the second voltage)/3}.

14. The lighting device according to claim 11, wherein the generating circuit is configured to generate, as the control signal, a signal for setting a time period, during which the switching element is electrically conducted, based on a difference voltage across a first reference voltage and a detected voltage corresponding to a current that flows in the light source, and wherein the controller is configured to output, to the driving circuit, the control signal that is generated by the generating circuit, upon detection, by the third detector, that a current value of the current flowing in the diode is within the predetermined range, when the first voltage and the second voltage satisfy a relationship (voltage value of the first voltage)>{(effective value of the second voltage)/3}.

15. The lighting device according to claim 12, wherein the generating circuit is configured to generate, as the control signal, a signal for setting a time period, during which the switching element is electrically conducted, based on a difference voltage across a first reference voltage and a detected voltage corresponding to a current that flows in the light source, and wherein the controller is configured to output, to the driving circuit, the control signal that is generated by the generating circuit, upon detection, by the third detector, that a current value of the current flowing in the diode is within the predetermined range, when the first voltage and the second voltage satisfy a relationship (voltage value of the first voltage)>{(effective value of the second voltage)/3}.

16. The lighting device according to claim 13, wherein the generating circuit is configured to generate, as the control signal, a signal for setting a time period, during which the switching element is electrically conducted, based on a difference voltage across a first reference voltage and a detected voltage corresponding to a current that flows in the light source, and wherein the controller is configured to output, to the driving circuit, the control signal that is generated by the generating circuit, upon detection, by the third detector, that a current value of the current flowing in the diode is within the predetermined range, when the first voltage and the second voltage satisfy a relationship (voltage value of the first voltage)>{(effective value of the second voltage)/3}.

17. A lighting fixture for providing power from an AC power source, comprising:

a lighting device; and a light source that can be turned on by the lighting device, wherein the lighting device, comprising:

a pair of input terminals to which the AC power source configured to output an AC current may be electrically connected;

a pair of output terminals to which the light source may be electrically connected;

a rectifier circuit configured to generate a pulsating current by full-wave rectification of the AC current;

a conversion circuit configured to convert the pulsating current from the rectifier circuit into a DC current, and to output the DC current to the pair of output terminals; and a control circuit configured to control the conversion circuit, wherein the rectifier circuit comprises:

a pair of first input ends electrically connected to the pair of input terminals, respectively; and a pair of first output ends electrically connected to the conversion circuit, wherein the conversion circuit is a single-ended primary inductance converter, wherein the conversion circuit comprises:

a pair of second input ends electrically connected to the pair of first output ends of the rectifier circuit, respectively;

a pair of second output ends electrically connected to the pair of output terminals, respectively;

a first capacitor connected between the pair of second input ends;

a first series circuit comprising a first inductor and a switching element, which are connected in series, and being connected in parallel to the first capacitor;

a second series circuit comprising a second capacitor and a second inductor, which are connected in series, and being connected in parallel to the switching element; and a third series circuit comprising a diode and a third capacitor, which are connected in series, and being connected in parallel to the second inductor, wherein the third capacitor is connected between the pair of second output ends, wherein the first inductor and the second inductor have inductances by which a time period, during which the diode is electrically connected, is made shorter than a half period of a resonance period of a closed loop circuit that comprises the first capacitor, the first inductor, the second capacitor and the third capacitor, and wherein the control circuit is configured to control the switching element in such a manner that the switching element is turned on at fixed periods.

18. The lighting fixture according to claim 17, wherein the inductance of the first inductor is larger than the inductance of the second inductor.

19. The lighting fixture according to claim 17, wherein the control circuit is configured to control the switching element in such a manner that a plurality of conduction periods, during which the switching element is electrically conducted, are constant.

20. The lighting fixture according to claim 17, wherein the control circuit comprises:

a driving circuit configured to drive the switching element; and a controller configured to control the driving circuit, wherein the controller comprises a generating circuit configured to generate a control signal for controlling the driving circuit, wherein the controller is configured to output, to the driving circuit, the control signal generated by the generating circuit, wherein the driving circuit is configured to drive the switching element according to the control signal from the controller, and wherein the generating circuit is configured to generate, as the control signal, a signal for controlling the driving circuit so as to turn on the switching element at the fixed periods.

* * * * *